(12) United States Patent
Lee et al.

(10) Patent No.: US 11,956,348 B2
(45) Date of Patent: Apr. 9, 2024

(54) SYSTEMS, METHODS, AND APPARATUS FOR SECURITY KEY MANAGEMENT FOR I/O DEVICES

(71) Applicant: Samsung Electronics Co., Ltd., Suwon-si (KR)

(72) Inventors: Pyeongwoo Lee, Sunnyvale, CA (US); Sumanth Jannyavula Venkata, Fremont, CA (US); Young Deok Kim, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 200 days.

(21) Appl. No.: 17/123,100

(22) Filed: Dec. 15, 2020

(65) Prior Publication Data

US 2022/0116205 A1   Apr. 14, 2022

Related U.S. Application Data

(60) Provisional application No. 63/090,162, filed on Oct. 9, 2020.

(51) Int. Cl.
*H04L 9/08*   (2006.01)

(52) U.S. Cl.
CPC .......... *H04L 9/0819* (2013.01); *H04L 9/0894* (2013.01)

(58) Field of Classification Search
CPC ............................ H04L 9/0819; H04L 9/0894

USPC ......................................................... 380/283
See application file for complete search history.

(56) References Cited

U.S. PATENT DOCUMENTS

| | | | |
|---|---|---|---|
| 8,972,733 B1* | 3/2015 | Wu | ........................ H04L 9/40 713/171 |
| 9,075,710 B2* | 7/2015 | Talagala | .............. G06F 12/0246 |
| 9,438,421 B1* | 9/2016 | Roth | ....................... H04L 9/088 |
| 10,482,022 B2 | 11/2019 | Kasten et al. | |
| 10,579,683 B2 | 3/2020 | Marukame et al. | |
| 11,082,217 B1* | 8/2021 | Donlan | ................ H04L 9/0861 |
| 2019/0034427 A1 | 1/2019 | Trika et al. | |
| 2021/0141943 A1* | 5/2021 | Van Leeuwen | ....... H04L 9/0894 |

* cited by examiner

*Primary Examiner* — Kambiz Zand
*Assistant Examiner* — Phuc Pham
(74) *Attorney, Agent, or Firm* — Renaissance IP Law Group LLP

(57) ABSTRACT

A method for managing security keys for an I/O device may include loading a first security key from a primary memory to a security engine, performing a first data transfer operation between a host and the I/O device using the first security key with the security engine, loading a second security key from a secondary memory to the security engine, and performing a second data transfer operation between the host and the I/O device using the second security key with the security engine. The method may further include storing the first security key in the primary memory based on a frequency of use of the first security key. The frequency of use of the first security key may be determined by a pattern of transfers between the host and the I/O device.

20 Claims, 8 Drawing Sheets

SYSTEMS, METHODS, AND APPARATUS FOR SECURITY KEY MANAGEMENT FOR I/O DEVICES

CROSS-REFERENCE TO RELATED APPLICATIONS

This application claims priority to, and the benefit of, U.S. Provisional Patent Application Ser. No. 63/090,162 titled "Systems, Methods, and Devices for Security Key Management for Storage Systems" filed Oct. 9, 2020 which is incorporated by reference.

TECHNICAL FIELD

This disclosure relates generally to security keys, and more specifically to systems, methods, and apparatus for security key management for I/O devices.

BACKGROUND

An input and/or output (I/O) device may use one or more security keys to protect data that may be transferred between a host and the device.

The above information disclosed in this Background section is only for enhancement of understanding of the background of the invention and therefore it may contain information that does not constitute prior art.

SUMMARY

A method for managing security keys for an I/O device may include loading a first security key from a primary memory to a security engine, performing a first data transfer operation between a host and the I/O device using the first security key with the security engine, loading a second security key from a secondary memory to the security engine, and performing a second data transfer operation between the host and the I/O device using the second security key with the security engine. Loading the second security key from the secondary memory may include transferring the second security key to the primary memory, and loading the second security key from the primary memory to the security engine. The method may further include storing the first security key in the primary memory based on a frequency of use of the first security key. The frequency of use of the first security key may be determined by a pattern of transfers between the host and the I/O device. The method may further include storing the first security key in the primary memory based on a predicted use of the first security key. The predicted use of the first security key may be based on a pattern of sequential accesses. The method may further include storing the first security key in the primary memory based on an address associated with the first security key. The method may further include locking the first security key in the primary memory. The address may be specified by the host. The method may further include evicting the first security key from the primary memory based on a policy.

A controller for an I/O device may include a data path configured to transfer data between a host and the I/O device, a security engine configured to perform a security operation on data transferred through the data path, and a key loader configured to: load a first security key from a primary memory to the security engine for a first data transfer operation through the data path using the first security key with the security engine, and load a second security key from a secondary memory to the security engine for a second data transfer operation through the data path using the second security key with the security engine. The controller may further include pattern logic configured to identify one or more patterns in data transfers between the host and the I/O device, and the key loader may be further configured to store the first security key in the primary memory based on the one or more patterns identified by the pattern logic. The one or more patterns may include a frequency of use. The one or more patterns may include a sequential access operation. The key loader may be further configured to store the first security key in the primary memory based on an address associated with the first security key. The address may be determined by the host. The controller may further include a second security engine arranged to secure the second security key in the secondary memory. The data path, security engine, key loader, and primary memory may be fabricated on an integrated circuit, and the secondary memory may be external to the integrated circuit.

A system may include a host, an input/output (I/O) device, a security engine coupled between the host and the I/O device, a primary memory, a secondary memory, and a key loader configured to: store a first security key in the primary memory based on a policy, store a second security key in the secondary memory based on the policy, load the first security key from the primary memory to the security engine for a first data transfer operation between the host and the I/O device using the first security key, and load the second security key from the secondary memory to the security engine for a second data transfer operation between the host and the I/O device using the second security key. The system may further include a second security engine coupled between the key loader and the secondary memory.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

In some embodiments, security keys for an input and/or output (I/O) device may be stored in primary and secondary memories. The primary memory may enable security keys to be loaded faster, but may be more expensive, occupy more space, consume more power, and/or the like. The secondary memory may be less expensive, occupy less space, consume less power, and/or the like, but may load security keys slower. By managing security keys in primary and secondary memories according to various policies, some embodiments may reduce the cost, space and/or power consumption associated with storing security keys while causing little or no reduction in the performance of an I/O device that may use the security keys for data transfers between the I/O device and a host.

For example, in some embodiments, one or more security keys associated with data transfers to and/or from frequently accessed addresses may be stored in primary memory, whereas security keys associated with data transfers to and/or from infrequently accessed addresses may be stored in secondary memory.

As another example, in some embodiments, key loading logic may anticipate an impending data transfer to and/or from a specific address. If a security key associated with the specific address is stored in secondary memory, the key loading logic may transfer the associated security key to primary memory prior to the transfer so the associated security key may be loaded faster when the transfer is initiated.

Key management policies may be static and/or dynamic and may be determined by various components, processes, and/or the like. For example, in a static key lock policy, a host may specify a first address range for which security keys are stored in primary memory and a second address range for which security keys are stored in secondary memory. As another example, in a dynamic policy, key loading logic may determine frequently accessed addresses based on I/O patterns and store security keys for the frequently accessed addresses in primary memory.

Additional features in some embodiments may include key entry lock policies based on address space areas, encryption of keys stored in external memory devices, and hybrid combinations of policies and/or features.

The inventive principles disclosed herein may be applied to a variety of I/O devices such as storage devices, network devices, and/or the like. The principles disclosed herein may have independent utility and may be embodied individually, and not every embodiment may utilize every principle. Moreover, the principles may also be embodied in various combinations, some of which may amplify the benefits of the individual principles in a synergistic manner.

Security Key Usage

Figure 1:
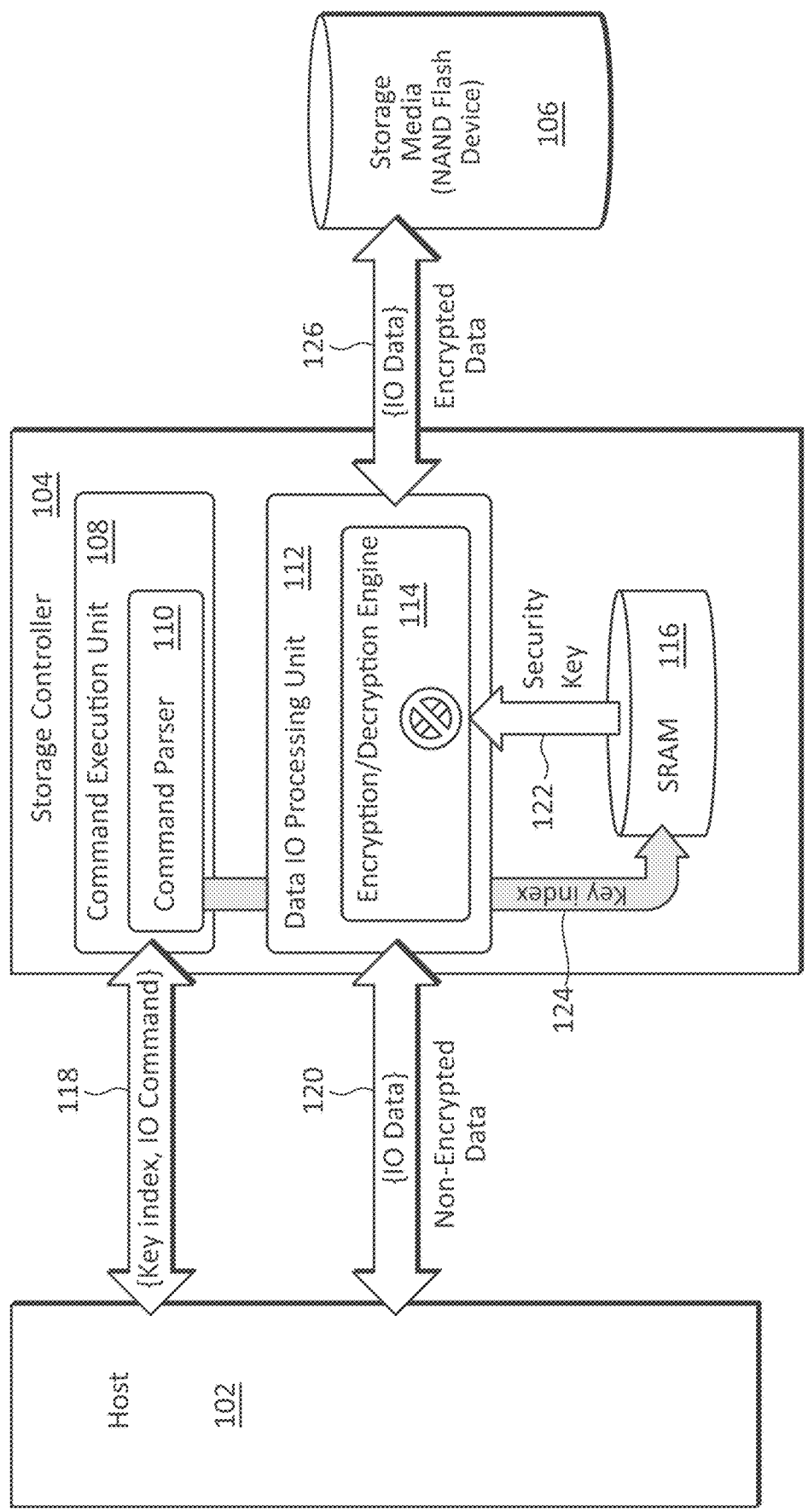
FIG. 1 illustrates an embodiment of a storage system that uses security keys to encrypt and/or decrypt data according to this disclosure.

FIG. 1 illustrates an embodiment of a storage system that uses security keys to encrypt and/or decrypt data according to this disclosure. The system illustrated in FIG. 1 may include a host 102, a storage controller 104, and storage media 106, which in this embodiment may be implemented with not-AND (NAND) flash memory devices. The storage controller 104 may include a command execution unit 108 having a command parser 110. The storage controller 104 may further include a static random access memory (SRAM) 116 and a data I/O processing unit 112 having an encryption/decryption engine 114.

To initiate a data transfer from the host 102 to the storage media 106, the host 102 may send a write command and key index as illustrated by arrow 118 to the command execution unit 108. The key index may identify a security key stored in the SRAM 116. The host 102 may then send write data to the data I/O processing unit 112 as shown by arrow 120. The command parser 110 may parse the write command, and the command execution unit 108 may execute the write command by initiating the transfer of data through the data I/O processing unit 112. The encryption/decryption engine 114 may encrypt the write data 120 using a security key (e.g., encryption key) 122 loaded from SRAM 116 in response to the key index 124 which was provided by the host 102 as illustrated by arrow 118. The encrypted write data may then be transferred to the storage media 106 as shown by arrow 126.

A transfer of data from the storage media 106 to the host 102 may proceed in a similar manner in the opposite direction. Specifically, the host 102 may send a read command and key index as illustrated by arrow 118 to the command execution unit 108. The command parser 110 may parse the read command, and the command execution unit 108 may execute the read command by initiating the transfer of data through the data I/O processing unit 112. The encryption/decryption engine 114 may decrypt the read data 126 using a security key (e.g., decryption key) 122 loaded from SRAM 116 in response to the key index 124 which was provided by the host 102 as illustrated by arrow 118. The decrypted read data may then be transferred to the storage host 102 as shown by arrow 120.

Some embodiments of storage systems may use a large number of security keys to encrypt and/or decrypt data. For example, in some embodiments, a storage system may have 64K or more security keys active at any given time. Moreover, in some example embodiments, a key (e.g., a key for Advanced Encryption Standard (AES) such as AES-256) may use 256 bits of memory. Thus, a storage system having 64K AES-256 keys may use about 2 MB of memory to store the security keys.

Security Key Management with Primary and Secondary Memory

Figure 2:
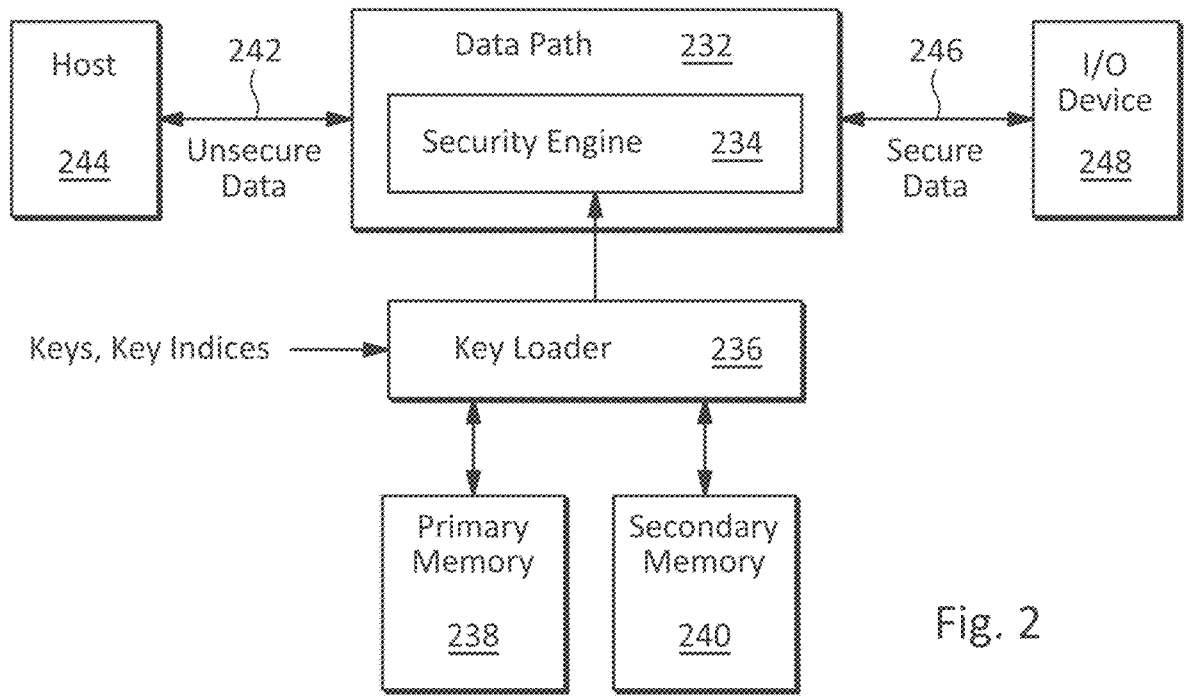
FIG. 2 illustrates an embodiment of a system that manages security keys according to this disclosure.

FIG. 2 illustrates an embodiment of a system that manages security keys according to this disclosure. The system illustrated in FIG. 2 may include a data path 232, a key loader 236, a primary memory 238, and a secondary memory 240. The data path 232 may receive at least partially unsecure data 242 from a host 244. In some embodiments, the data 242 may be considered unsecure from the perspective of the data path 232 if the data path 232 has not encrypted the data 242. For example, the host 244 may have already performed some encryption on the data 242, but the data path 232 may not be aware of the encryption performed by the host 244. Thus, even though the data 242 may be encrypted in some way, it may be considered unsecure from the perspective of the data path 232 if the data path 232 has not performed any encryption on the data 242. The data path 232 may then secure some or all of the received data 242, and transmit the at least partially secured data 246 to an I/O device 248. In some embodiments, the data 246 may be considered secure from the perspective of the data path. Additionally, or alternatively, the data path 232 may receive at least partially secure data 246 from the I/O device 248, convert some or all of the data 246 to an unsecured form, and transmit the at least partially unsecure data 242 to the host 244.

The data path 232 may include a security engine 234 that may convert data between secure and unsecure forms using one or more security keys that may be stored in the primary memory 238 and/or the secondary memory 240 and managed by the key loader 236.

The data path 232 may be configured to process data in any manner suitable for the type of I/O device 248 being used. For example, if the I/O device 248 is implemented as a solid state drive (SSD) having flash memory storage media, the data path 232 may include a flash translation layer (FTL) that may map logical block addresses (LBAs) from the host to physical addresses in the flash memory storage media. In other embodiments, a storage device may be implemented with any other type of solid state storage media, magnetic media, optical media, and/or the like.

As another example, if the I/O device 248 is implemented as a wired or wireless network device, the data path 232 may implement one or more layers of a network stack that may perform functions such as network address translation, as well as transmitter and/or receiver functions that may couple data to and/or from a wired or wireless physical transmission medium.

The security engine 234 may implement any type of data security method including encryption, tokenization, masking, and/or the like. Examples of encryption methods include Advanced Encryption System (AES), Rivest-Shamir-Adleman (RSA), and/or the like.

The key loader 236 may be implemented in a wide variety of configurations and may manage security keys based on any of a wide variety of policies according to this disclosure. In some embodiments, the key loader 236 may be configured as a switch and/or buffer between the primary memory 238 and/or the secondary memory 240 and/or the security engine 234. For example, in some embodiments, the key loader 236 may load security keys stored in the primary memory 238 directly to the security engine 234, whereas the key loader 236 may first transfer security keys stored in the secondary memory 240 to the primary memory 238 before being loaded to the security engine 234. As another example, in some other embodiments, security keys stored in the secondary memory 240 may be loaded directly to the security engine 234. As a further example, in some embodiments, security keys may be transferred between the primary memory 238 and the secondary memory 240 in a caching mechanism to keep security keys that are more frequently used, or are predicted to be used soon, in the primary memory 238 based, for example, on hints collected from I/O patterns such as sequential read and/or write operations.

In some embodiments, the key loader 236 may receive security keys from the host 244, a command execution unit, and/or any other source, and store the security keys in the primary memory 238 and/or the secondary memory 240 based on various policies. The key loader 236 may then access the security keys in response to key indices provided by the host 244, command execution unit, and/or other sources.

The primary memory 238 and the secondary memory 240 may be implemented with any types of memory devices including SRAM, dynamic random access memory (DRAM), electrically erasable programmable read-only memory (EEPROM) including flash memory, persistent memory such as cross-gridded nonvolatile memory with bulk resistance change, and/or the like. In some embodiments, the secondary memory 240 may have one or more characteristics such as substantially lower cost, power consumption, and/or the like, compared to the primary memory 238 that may be advantageous for storing a relatively large number of keys, although possibly with less favorable access speed and/or other characteristic. Some embodiments may include one or more additional memories, for example, a tertiary memory for storing security keys.

The components illustrated in any of the embodiments described herein may be implemented with hardware, software, or any combination thereof. For example, in some embodiments, any of these components may include circuitry such as combinational logic, sequential logic, one or more timers, counters, registers, state machines, volatile memories such as dynamic random access memory (DRAM) and/or static random access memory (SRAM), nonvolatile memory such as flash memory, complex programmable logic devices (CPLDs), field programmable gate arrays (FPGAs), application specific integrated circuits (ASICs), complex instruction set computer (CISC) and/or reduced instruction set computer (RISC) processors executing instructions, and/or the like, to perform their respective functions.

Although illustrated as individual components, in some embodiments, some components shown separately may be integrated into single components, and/or some components shown as single components may be implemented with multiple components. Moreover, one or more of the data path, security engine, key loader, primary memory, and/or secondary memory may be partially or entirely integral with the I/O device, the host, and/or other components.

In some embodiments, the key loader 236 may be implemented with dedicated hardware. In other embodiments, the key loader may be implemented as a special or dedicated (e.g., isolated) thread of a central processing unit (CPU) that may implement one or more functions of any of the other components illustrated in the drawings. In some embodiments, the key loader may be implemented as a hybrid combination of these forms, or in any other suitable form.

In some example embodiments, the data path 232, security engine 234, key loader 236, and primary memory 238 may be implemented on an integrated circuit (IC) such as a controller IC chip for a storage device or a network device, while the secondary memory 240 may be implemented as an off-chip component. Thus, a relatively small number of security keys may be stored in relatively fast but expensive on-chip SRAM, while a relatively larger number of security keys may be stored in relatively slow but inexpensive off-chip DRAM.

Communications with the host 244 and/or the I/O device 248 may be implemented with any type of interconnect interfaces, network interfaces, storage interfaces and/or the like. For example, in some embodiments, one or more interfaces may be implemented with an interconnect interface such as Peripheral Component Interconnect Express (PCIe), Compute Express Link (CXL), and/or the like, and/or a network interface such as Ethernet, InfiniBand, Fibre Channel, and/or the like, and/or a storage interface such as Serial ATA (SATA), Serial Attached SCSI (SAS), Nonvolatile Memory Express (NVMe), and/or the like.

Figure 3:
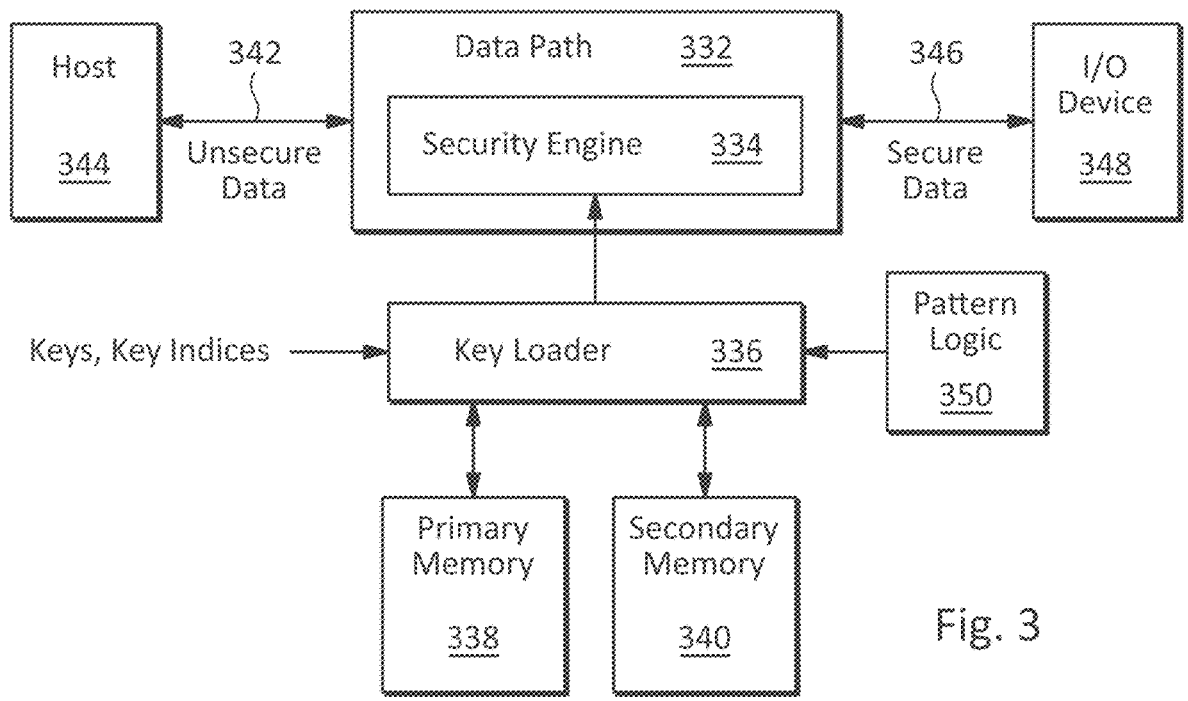
FIG. 3 illustrates an embodiment of a key management system including I/O pattern recognition according to this disclosure.

FIG. 3 illustrates an embodiment of a key management system including I/O pattern recognition according to this disclosure. The system illustrated in FIG. 3 may include components similar to those illustrated in FIG. 2, along with pattern logic 350 which may observe I/O operations through the data path 332 to identify patterns that may provide hints for policies that may improve the management of security keys by the key loader 336. For example, in some embodiments, the pattern logic 350 may identify frequently accessed address ranges for which security keys may be locked in the primary memory 338. As another example, the pattern logic 350 may identify address ranges and/or groups that tend to be accessed sequentially. Thus, if an address in an identified range or group is accessed, the key loader 336 may transfer security keys for other addresses in the range from the secondary memory 340 to the primary memory 338 (and possibly evict other security keys from the primary memory 338 to the secondary memory 340) because the other addresses in the range and/or group may be more likely or predicted to be accessed soon.

In some embodiments, I/O patterns may be collected from, and the pattern logic 350 may be located in, any component illustrated in FIG. 3 or other components not illustrated, and/or distributed between multiple components. For example, the pattern logic 350 may be implemented as part of, and/or collect I/O pattern data from, a command execution unit, a data I/O processing unit (which may be implemented as part of the data path 332), the key loader 336, and/or the like, or any combination thereof.

Figure 4:
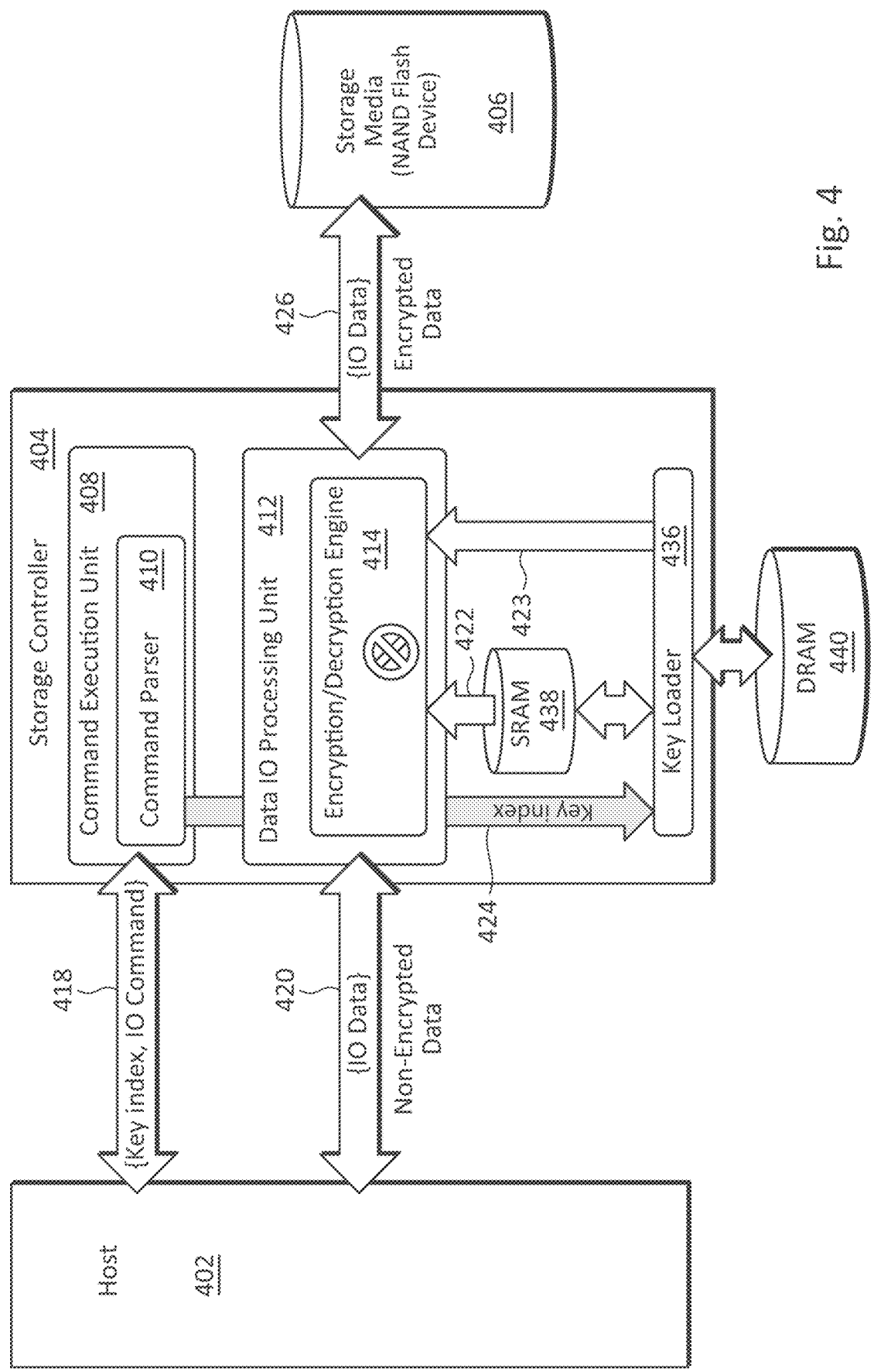
FIG. 4 illustrates an example embodiment of a system that manages security keys according to this disclosure.

FIG. 4 illustrates an example embodiment of a system that manages security keys according to this disclosure. The system illustrated in FIG. 4 may include some components similar to those illustrated in FIG. 1 such as a host 402, a storage controller 404, and storage media 406, which in this embodiment may be implemented with NAND flash memory devices. The storage controller 404 may include a command execution unit 408 having a command parser 410. The controller 404 may also include an SRAM 438, and a data I/O processing unit 412 having an encryption/decryption engine 414.

The system illustrated in FIG. 4 may further include a DRAM 440 and a key loader 436. The key loader 436 may store some security keys in the SRAM 438 and some security keys in the DRAM 440 based on one or more policies. For example, the key loader 436 may store some security keys in the SRAM 438 and hold these keys in a key entry lock based on address ranges specified by the host 402 as described in more detail below. As another example, the key loader 436 may implement a caching mechanism to keep frequently used security keys in SRAM 438, while less frequently used security keys may be stored in the DRAM 440. In some embodiments, the key loader 436 may also identify groups of addresses that are frequently accessed together and may prefetch one or more groups into SRAM when one of the group is accessed. In some embodiments, the key loader 436 may implement a combination of these and/or other policies.

To initiate a data transfer from the host 402 to the storage media 406, the operation of the system illustrated in FIG. 4 may be similar to that illustrated in FIG. 1. However, the key loader 436 may receive a key index 424 for the transfer and load the corresponding security key (e.g., encryption key) 422 or 423 to the encryption/decryption engine 414. If the indexed security key is available in the SRAM 438, it may be loaded directly to the encryption/decryption engine 414. If the indexed security key is stored in the DRAM 440 instead of the SRAM 438, the key loader 436 may first transfer the security key to the SRAM 438 and then load the security key to the encryption/decryption engine 414. Depending on the implementation details and/or availability of space in the SRAM 438, the key loader 436 may evict one or more security keys from the SRAM 438 to the DRAM 440 to make room for the indexed security key in the SRAM 438. Alternatively, the key loader may load the indexed security key directly from the DRAM 440 to the encryption/decryption engine 414. As another alternative, the key loader 436 may load a security key from DRAM 440 to the encryption/decryption engine 414 and then to SRAM 438. As yet another alternative, the key loader 436 may load a security key from DRAM 440 to SRAM 438 and the encryption/decryption engine 414 in parallel. In any of these implementations, accessing the security key from the DRAM 440 may take additional time (e.g., an extra clock cycle) compared to accessing the key from the SRAM 438.

A transfer of data from the storage media 406 to the host 402 may proceed in a similar manner in the opposite direction. The key loader 436 may load the indexed security key (e.g., decryption key) from the SRAM 438 or the DRAM 440, depending on its location, to the encryption/decryption engine 414. If the security key is stored in the DRAM 440, the key loader 436 may load the security key through the SRAM 438, or alternatively directly from the DRAM 440.

Although illustrated in the context of a storage device 406, the embodiment illustrated in FIG. 4 may also be implemented with any other type of I/O device such as a network device.

Figure 5:
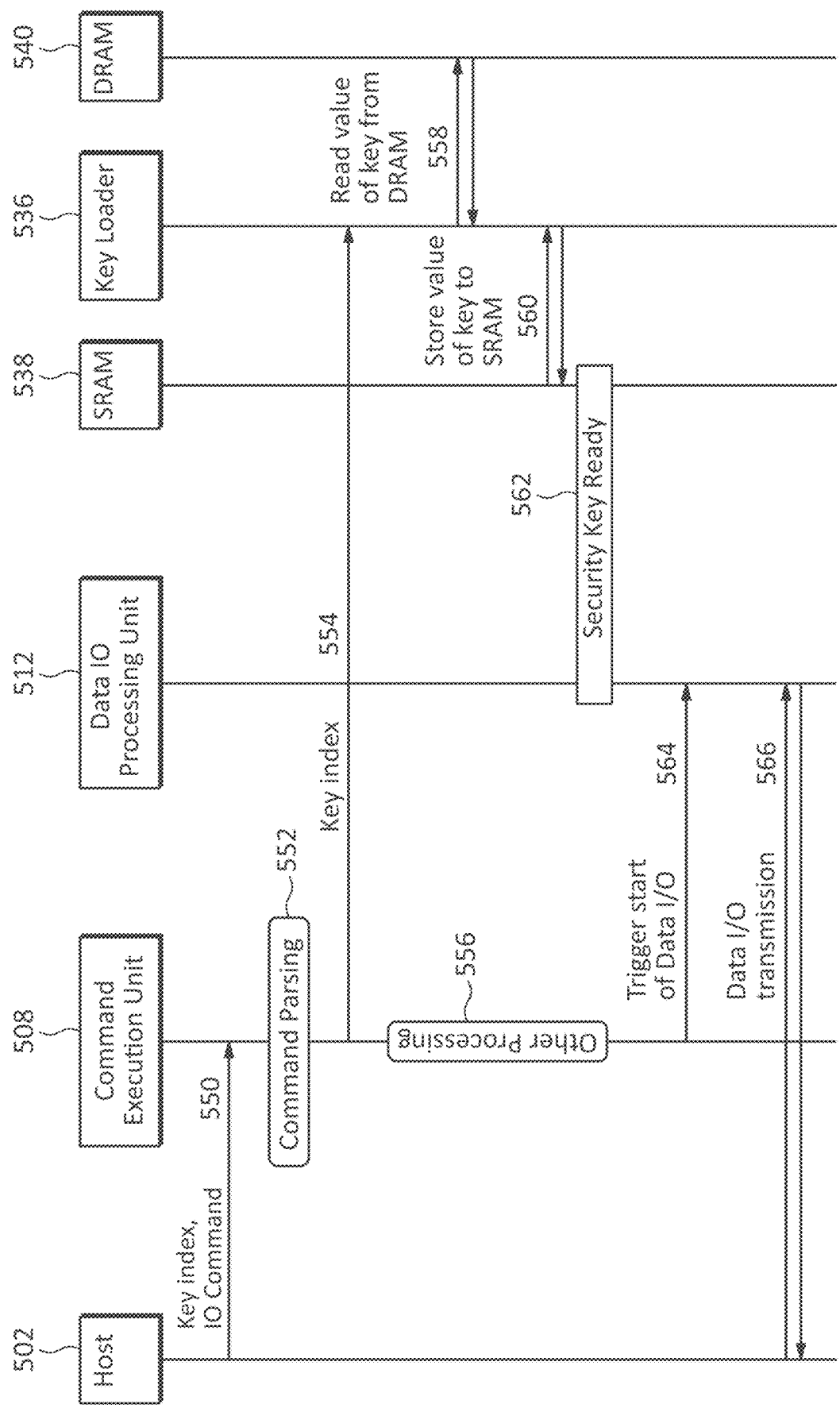
FIG. 5 illustrates a sequence diagram for an embodiment of a data transfer operation using a key loading method according to this disclosure.

FIG. 5 illustrates a sequence diagram for an embodiment of a data transfer operation using a key loading method according to this disclosure. The embodiment illustrated in FIG. 5 may be used, for example, with any of the systems and/or components described in this disclosure such as those illustrated in FIGS. 2-4 and 6-7.

The embodiment illustrated in FIG. 5 may be implemented with a host 502, a command execution unit 508, a data I/O processing unit 512, an SRAM 538, a key loader 536, and a DRAM 540.

The method may begin at operation 550 when the host 502 sends an I/O command (e.g., read command, write command, and/or the like) along with a key index for a security key to the command execution unit 508. The I/O command may be parsed at operation 552, for example, by a command parser in the command execution unit 508. The command execution unit 508 may then send the security key index to the key loader 536 at operation 554.

The command execution unit 508 may then perform other processing at operation 556. The other processing may include managing various resources that may be involved in processing a command for an I/O device controller. For example, the command execution unit 508 may perform, or manage other resources to perform, one or more operations relating to block address or network address translation, initiating a write to, or read from, a storage device, initiating a transmission or reception through a network adapter, and/or the like. As another example, at operation 556, the command execution unit 508 may partially or fully parse another command.

In response to receiving the key index at operation 554, the key loader 536 may determine that the indexed security key is currently stored in DRAM 540. The key loader 536 may then read the value of the security key from the DRAM 540 at operation 558. At operation 560, the key loader 536 may write the value of the security key to the SRAM 538. Depending on the implementation details and availability of space in the SRAM 538, one or more security keys may be evicted from the SRAM 538 and returned to the key loader 536 at operation 560. The key loader 536 may then store the evicted security key in the DRAM 540 in an operation that is not shown.

The key loader may then load the security key to the data I/O processing unit 512 at operation 562. In some embodiments, at operation 562, the data I/O processing unit 512 may signal the command execution unit 508 that the security key is ready.

When the command execution unit 508 has completed the other processing 556, it may initiate the data transfer between the host 502 and the data I/O processing unit 512 at operation 564, and consequently, the I/O device (not illustrated) which may proceed at operation 566. A security engine in the data I/O processing unit 512 may use the security key to secure (e.g., encrypt) data transferred from the host 502 to the I/O device, or unsecure (e.g., decrypt) data transferred from the I/O device to the host 502.

In some embodiments, accessing a security key from the DRAM 540 may take additional time (e.g., an extra clock cycle) compared to accessing a key from the SRAM 538. However, during the process of accessing a security key from the DRAM 540 (e.g., operations 558 and 560), the command execution unit 508 may be busy with other processing. For example, in some embodiments, the command execution unit 508 may manage a relatively large amount of resources in the controller to process a command. Therefore, depending on the implementation details and specific circumstances, loading a security key from the DRAM 540 may be performed ahead of other processing to save time. Thus, in this example, the key loader may utilize the time interval between command parsing and the actual I/O data transfer start time (e.g., at the head of the other processing time) to fetch the security key from the DRAM 540.

Figure 6:
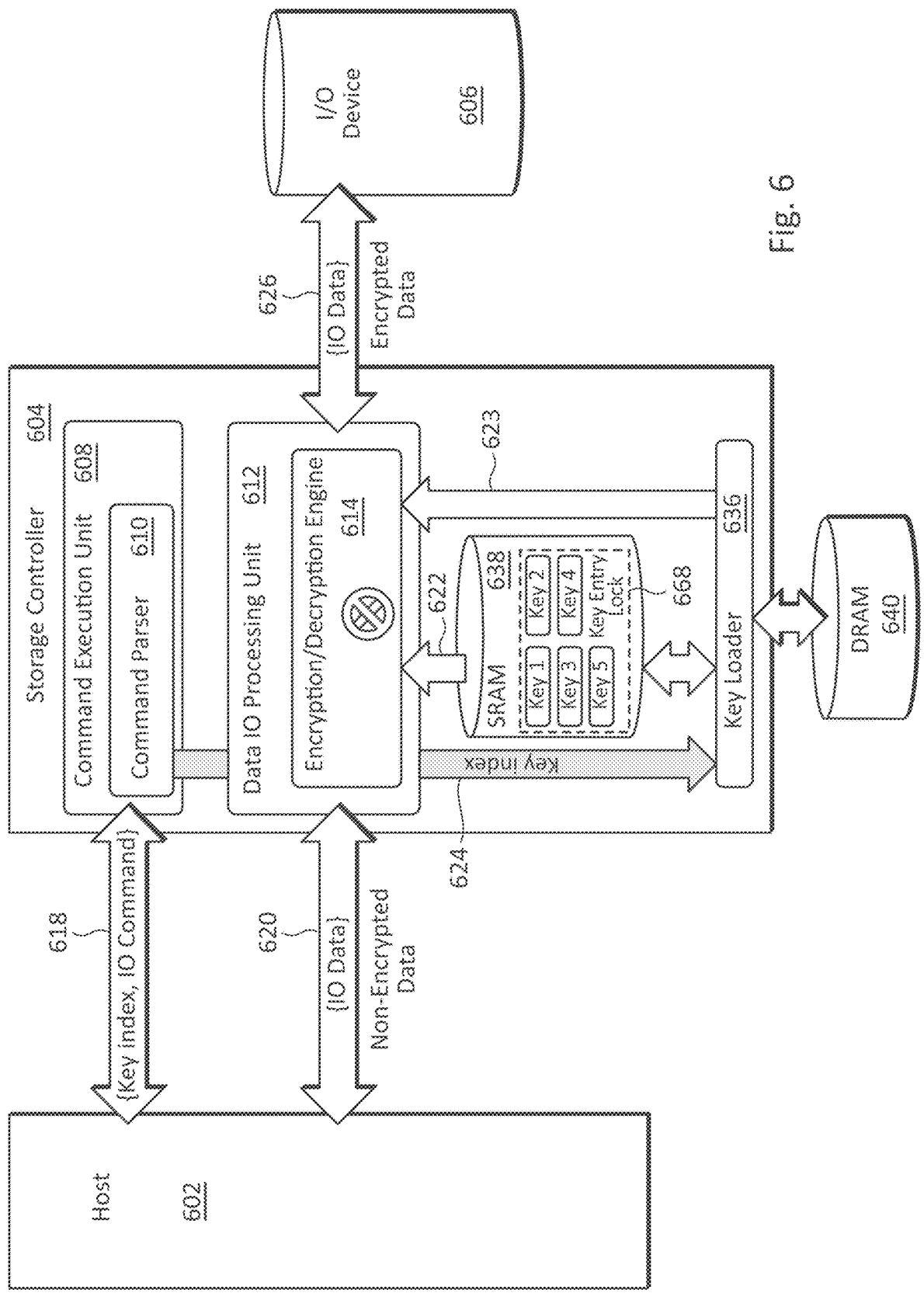
FIG. 6 illustrates an example embodiment of a security key management system having a key entry lock according to this disclosure.
Figure 7:
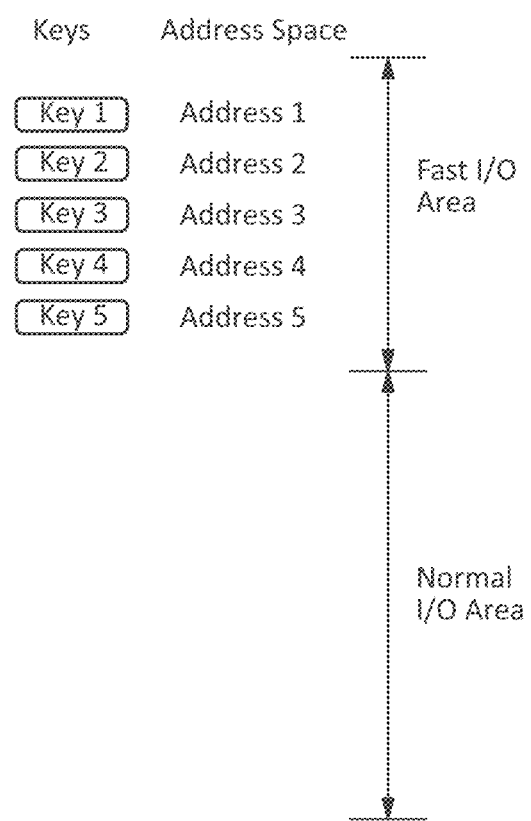
FIG. 7 illustrates an embodiment of an address space for use with a key entry lock according to this disclosure.

FIG. 6 illustrates an example embodiment of a security key management system having a key entry lock according to this disclosure. FIG. 7 illustrates an embodiment of an address space for use with a key entry lock according to this disclosure.

The system illustrated in FIG. 6 may include some components similar to those illustrated in FIG. 4 such as a host 602, a storage controller 604, a command execution unit 608, a command parser 610, a data I/O processing unit 612, an encryption/decryption engine 614, an SRAM 638, a DRAM 640, and a key loader 636. The embodiment illustrated in FIG. 6 may also include an I/O device 606 which may be implemented, for example, as a storage device, network device, and/or the like.

In some embodiments, the system illustrated in FIG. 6 may operate in a manner similar to the system of FIG. 4, however, the key loader 636 may be configured to implement a key entry lock 668 in the SRAM 638, which may lock one or more security keys into the primary memory to protect them from being evicted from the primary memory so they are ready for more immediate access and use by the encryption/decryption engine 614 than security keys stored in the DRAM 640.

The one or more security keys locked in the primary memory may be determined through any type of policy. For example, in some embodiments, an address space for the I/O device 606 may include a fast I/O area and a normal I/O area as shown in FIG. 7. Security keys for the fast I/O area (Key 1, Key 2, Key 3, Key 4, and Key 5) may be stored in the SRAM 638, while security keys for the normal I/O area may be stored in the DRAM 640. In some embodiments, the host 602 may specify one or more address ranges or groups for which security keys may be locked in the primary memory. For example, the host 602 may specify one or more address ranges for the fast I/O area that provide an acceptable cache miss penalty. Additionally, or alternatively, the key loader 636 may allocate some or all of a key entry lock portion of the SRAM 638 for security keys that pattern logic may identify as frequently used and/or predict to be used soon. In some embodiments, the key loader 636 may preload into SRAM 638 one or more security keys based, for example, on detected patterns of usage. In some embodiments, the key loader 836 may always prefetch one or more keys and preload them into SRAM 638 for one or more next consecutive addresses in DRAM.

The address space illustrated in FIG. 7 may be used with any type of I/O device. For example, if the I/O device is implemented as a storage device, the address space may represent logical block addresses where some logical block addresses may be designated as a fast I/O area and other logical block addresses may be designated as a normal I/O area. As another example, if the I/O device is implemented as a network device, the address space may represent network addresses where some network address may be designated as a fast I/O area and other network addresses may be designated as a normal I/O area.

Figure 8:
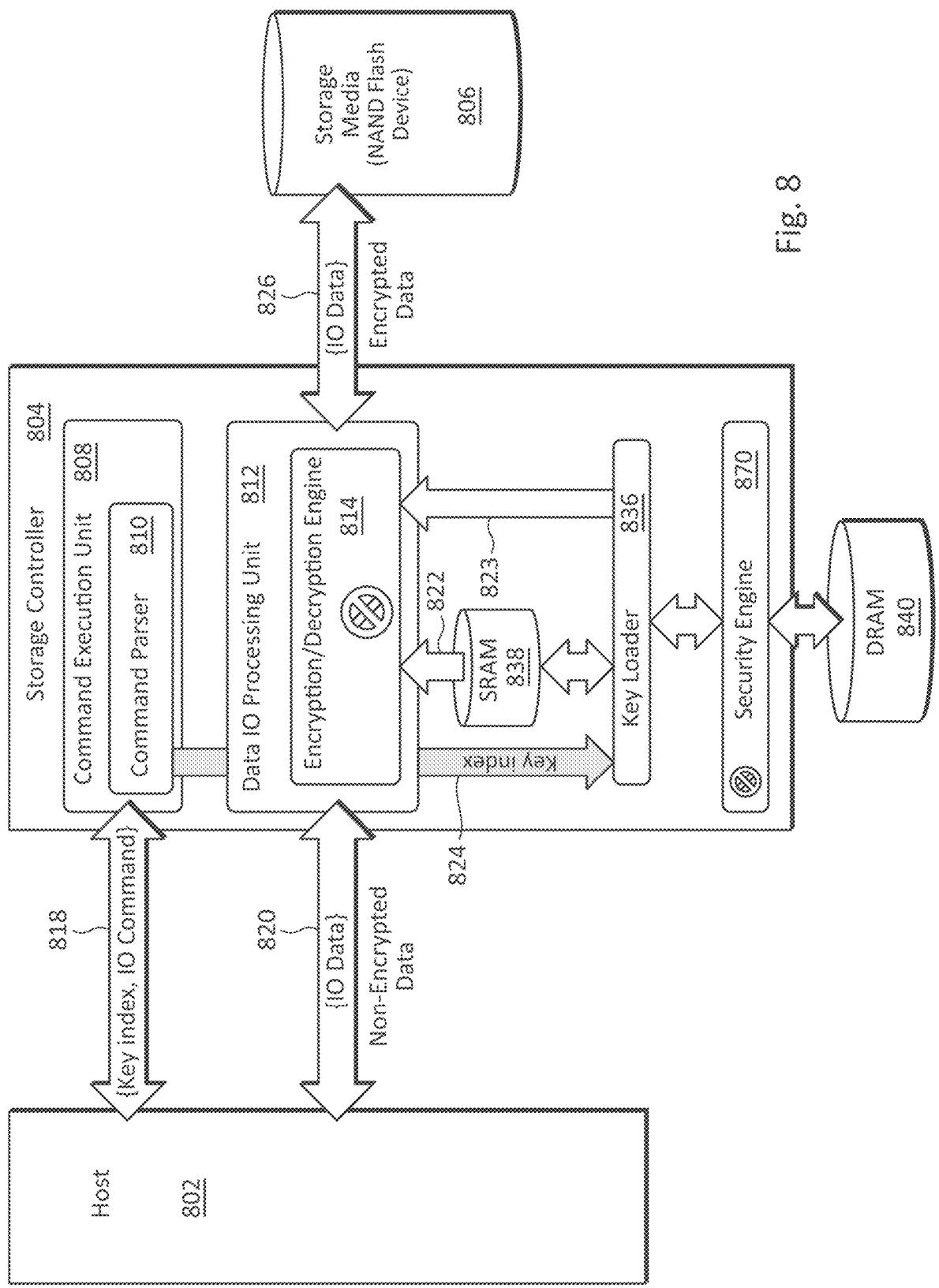
FIG. 8 illustrates an example embodiment of a security key management system that provides protection for security keys stored in secondary memory according to this disclosure.

FIG. 8 illustrates an example embodiment of a security key management system that provides protection for security keys stored in secondary memory according to this disclosure.

The system illustrated in FIG. 8 may include some components similar to those illustrated in FIG. 4 such as a host 802, a storage controller 804, a storage media 806, a command execution unit 808, a command parser 810, a data I/O processing unit 812, an encryption/decryption engine 814, an SRAM 838, a DRAM 840, and a key loader 836.

The system illustrated in FIG. 8 may also include a second security engine 870 that may secure one or more security keys stored in secondary memory, which in this example, may be implemented as DRAM 840. The second security engine 870 may implement any number of layers of any type of data security methods including encryption (e.g., AES, RSA, and/or the like), tokenization, masking, and/or the like. In the embodiment illustrated in FIG. 8, the second security engine 870 may encrypt security keys as they are written to the DRAM 840 and decrypt the security keys as they are read from the DRAM 840 by the key loader 836. In some embodiments, one or more security keys may be used by the security engine 870 to encrypt and/or decrypt the security keys stored in DRAM 840. In some embodiments, the security keys used by the security engine 870 may be stored in the security engine 870, for example, by preconfiguration from the host 802 at initialization time so the security keys are not exposed outside of the storage controller 804, which in some implementations may be fabricated on an IC.

The use of a security engine to protect security keys stored in secondary memory may be advantageous, for example, in embodiments in which the secondary memory may be located externally to the other components. For example, in some embodiments, the storage controller 804 may be implemented on an IC, and the DRAM 840 may implemented as an external memory device which may expose security keys outside of the IC package. Implementing the second security engine 870 inside the IC package may reduce or eliminate this exposure. In some embodiments, the second security engine (or an additional security engine) may be configured to also protect security keys in the primary memory (SRAM) 838.

Figure 9:
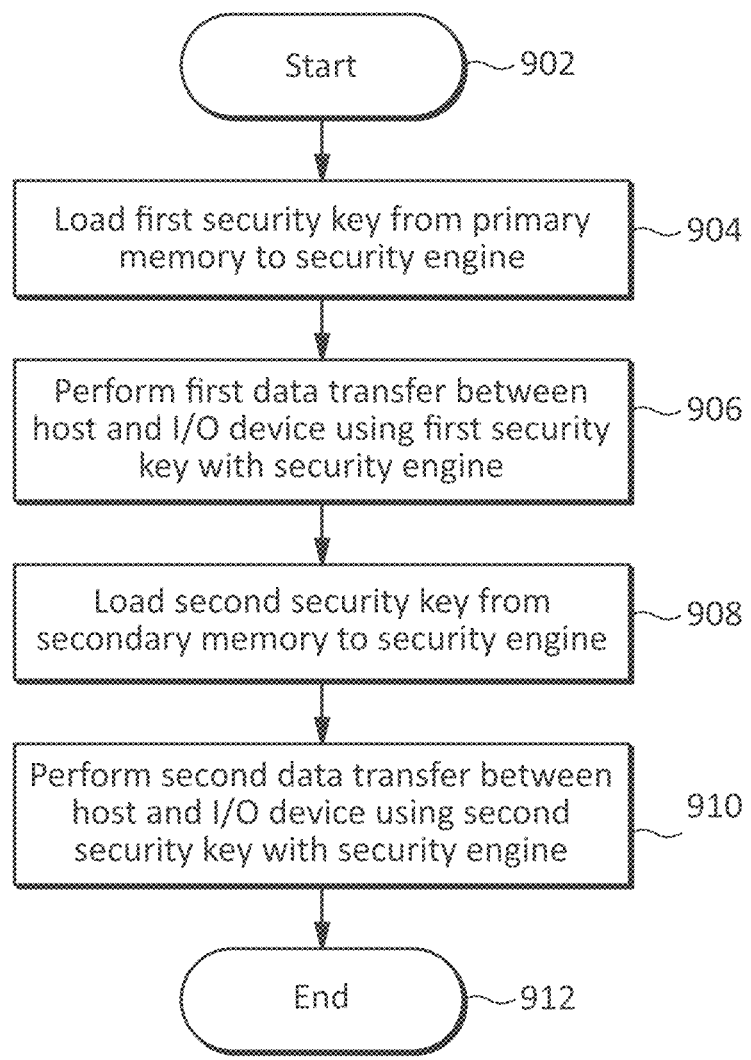
FIG. 9 illustrates a flowchart of an embodiment of a method for managing security keys for an I/O device according to this disclosure.

FIG. 9 illustrates a flowchart of an embodiment of a method for managing security keys for an I/O device according to this disclosure. The method may begin at operation 902. At operation 904, the method may load a first security key from a primary memory to a security engine. At operation 906, the method may perform a first data transfer operation between a host and the I/O device using the first security key with the security engine. At operation 908, the method may load a second security key from a secondary memory to the security engine. At operation 910, the method may perform a second data transfer operation between the host and the I/O device using the second security key with the security engine. The method may terminate at operation 912.

The operations and/or components described with respect to the embodiment illustrated in FIG. 9, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different location. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. In some embodiments, "based on" may refer to "based at least in part on." In some embodiments, "disabled" may refer to "disabled at least in part." A reference to a first thing may not imply the existence of a second thing.

Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for managing security keys for an input/output (I/O) device, the method comprising:
    loading a first security key from a primary memory of a first type to a security engine based on a pattern of accessed address ranges identified by the security engine;
    performing a first data transfer operation between a host and the I/O device using the first security key with the security engine by encrypting a first piece of data with the first security key for the first data transfer operation;
    loading a second security key from a secondary memory of a second type to the security engine based on the pattern of accessed address ranges identified by the security engine, wherein the first type of the primary memory and the second type of the secondary memory are different; and
    performing a second data transfer operation between the host and the I/O device using the second security key with the security engine by encrypting a second piece of data with the second security key for the second data transfer operation, wherein the first security key is stored in the primary memory based on the pattern of accessed address ranges identified by the security engine, and the second security key is stored in the secondary memory based on the pattern of accessed address ranges identified by the security engine.

2. The method of claim 1, wherein loading the second security key from the secondary memory comprises:
    transferring the second security key to the primary memory; and
    loading the second security key from the primary memory to the security engine.

3. The method of claim 1, further comprising storing the first security key in the primary memory based on a determination of the pattern of accessed address ranges accounting for a frequency of use of the first security key.

4. The method of claim 3, wherein the frequency of use of the first security key is determined by a pattern of transfers between the host and the I/O device.

5. The method of claim 1, further comprising storing the first security key in the primary memory based on a determination of the pattern of accessed address ranges accounting for a predicted use of the first security key.

6. The method of claim 5, wherein the predicted use of the first security key is based on a pattern of sequential accesses.

7. The method of claim 1, further comprising storing the first security key in the primary memory based on an address associated with the first security key.

8. The method of claim 7, further comprising locking the first security key in the primary memory.

9. The method of claim 7, wherein the address is specified by the host.

10. The method of claim 1, further comprising evicting the first security key from the primary memory based on a policy.

11. A controller for an input/output (I/O) device, the controller comprising:
    a data path configured to transfer data between a host and the I/O device;
    a security engine configured to perform a security operation on data transferred through the data path; and
    a key loader configured to:
        load a first security key from a primary memory of a first type to the security engine based on a pattern of accessed address ranges identified by the security engine, for a first data transfer operation through the data path using the first security key with the security engine to encrypt a first piece of data; and load a second security key, from a secondary memory of a second type based on the pattern of accessed address ranges identified by the security engine, wherein the first type of the primary memory and the second type of the secondary memory are different and wherein the first security key is stored in the primary memory based on the pattern of accessed address ranges identified by the security engine, and the second security key is stored in the secondary memory based on the pattern of accessed address ranges identified by the security engine.

12. The controller of claim 11, wherein:
the controller further comprises pattern logic configured to identify one or more patterns in data transfers between the host and the I/O device; and
the key loader is further configured to store the first security key in the primary memory based on the one or more patterns identified by the pattern logic.

13. The controller of claim 12, wherein the one or more patterns comprise a frequency of use.

14. The controller of claim 12, wherein the one or more patterns comprise a sequential access operation.

15. The controller of claim 11, wherein the key loader is further configured to store the first security key in the primary memory based on an address associated with the first security key.

16. The controller of claim 15, wherein the address is determined by the host.

17. The controller of claim 11, further comprising a second security engine arranged to secure the second security key in the secondary memory.

18. The controller of claim 11, wherein the data path, security engine, key loader, and primary memory are fabricated on an integrated circuit, and the secondary memory is external to the integrated circuit.

19. A system comprising:
a host;
an input/output (I/O) device;
a security engine coupled between the host and the I/O device;
a primary memory of a first type;
a secondary memory of a second type, wherein the first type of the primary memory and the second type of the secondary memory are different; and
a key loader configured to:
store a first security key in the primary memory based on a policy accounting for a pattern of accessed address ranges identified by the security engine;
store a second security key in the secondary memory based on the policy accounting for the pattern of accessed address ranges identified by the security engine;
load the first security key from the primary memory to the security engine based on the pattern of accessed address ranges identified by the security engine for a first data transfer operation between the host and the I/O device using the first security key to encrypt a piece of data with the first security key for the first data transfer operation; and
load the second security key from the secondary memory to the security engine based on a pattern of accessed address ranges identified by the security engine for a second data transfer operation between the host and the I/O device using the second security key to encrypt a second piece of data with the second security key for the second data transfer operation.

20. The system of claim 19, further comprising a second security engine coupled between the key loader and the secondary memory.

* * * * *